Patented June 1, 1943

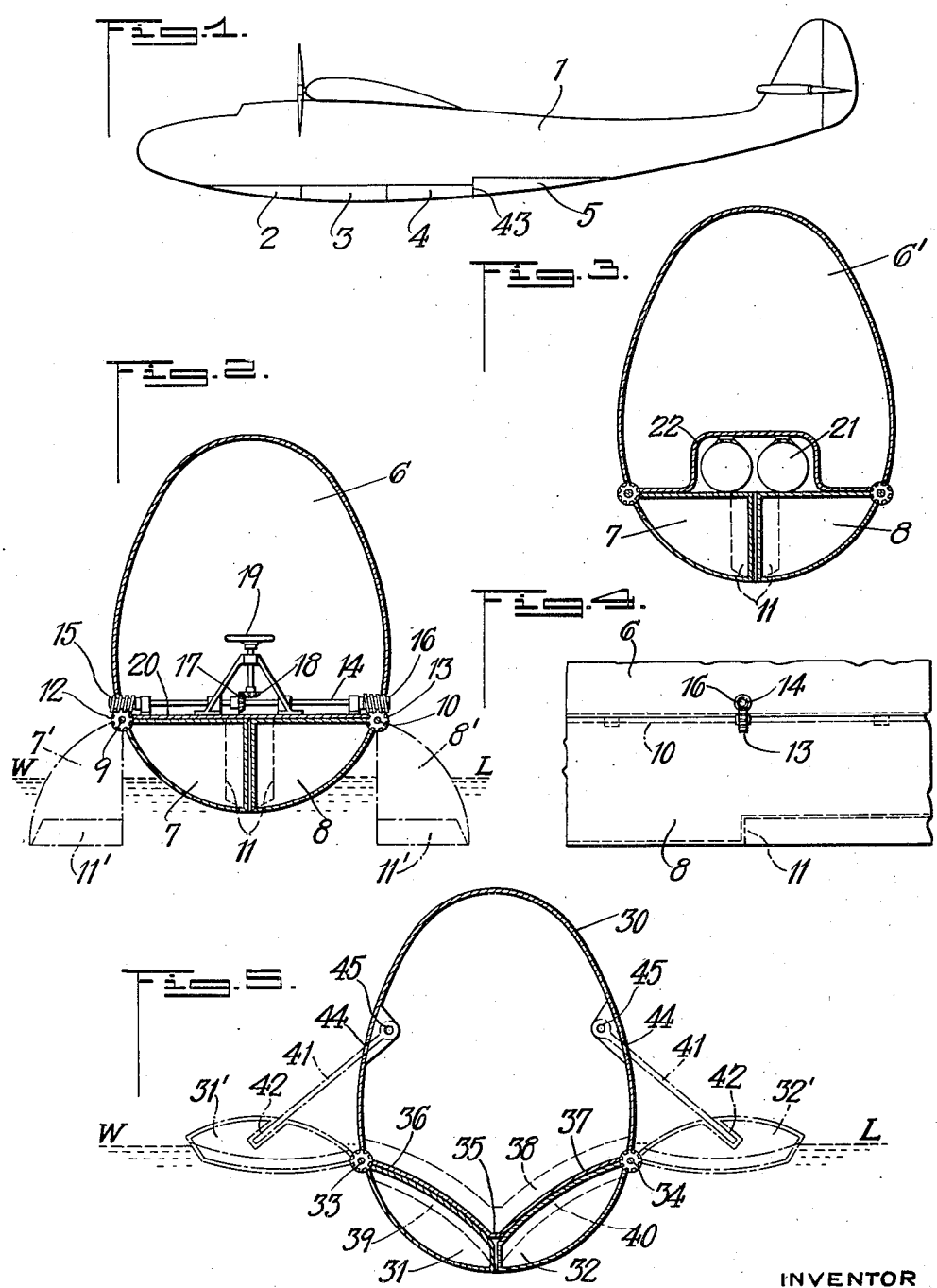

2,320,574

UNITED STATES PATENT OFFICE 2,320,574

HYDROAIRCRAFT

Claude Dornier, Friedrichshafen-on-the-Bodensee, Germany; vested in the Alien Property Custodian Application January 31, 1939, Serial No. 253,746
In Germany February 2, 1938

9 Claims. (Cl. 244—102)

The present invention relates to aircraft adapted to descend on water, more particularly to the provision of a fuselage design and construction comprising floats which do not cause air resistance when the aircraft is in flight and produce great stability when the machine rests on the water.

It has been proposed to provide stabilizing floats and lateral float stumps which can be retracted into the fuselage. Such constructions require much space in the fuselage which space cannot be used for other purposes.

It is an object of the present invention to provide a float arrangement of the least possible air resistance and utmost stabilizing effect on the water. With the arrangement according to the present invention the fuselage, when in the air, has a configuration of high aerodynamic efficiency, has no steps, projections or the like which cause air resistance and, when on the water, has great lateral stability because it floats on at least two floats and possibly additional floats situated along the sides of the floating fuselage.

Fuselages have been proposed which comprise an upper part for receiving operating personnel and passengers, operating material, freight or the like and a lower part which is longitudinally divided whereby the upper part is adapted to float but causes too much resistance for starting and whereby the lower part is always built as float and has such streamlined configuration as to be suitable for starting.

An object of the present invention is to provide a fuselage with floating bodies which form the lower part of the fuselage and which fuselage, when in the air, is a compact, streamlined body of very small air resistance. According to the present invention the floating bodies are hinged to the upper part of the fuselage by means of axles which are disposed substantially in the direction of flight and said bodies are adapted to be swung with respect to the upper part of the fuselage downward and laterally. The joint between the individual floating bodies extends longitudinally in the direction of flight. Upon swinging the floating bodies 90° downward out of their position when the fuselage is in flight floats are formed which, when the aircraft rests on water, support the upper part of the fuselage high above the surface of the water. If the machine is designed for starting and landing with the two floats swung out, it is not absolutely necessary that the upper part of the fuselage is adapted to float. If the floats according to the present invention are further swung out of their flying position, say over an angle of approximately 180°, i. e. not only downward but also laterally, a flying boat is formed whereby the upper part of the fuselage rests on water and has laterally projecting floats which provide additional floating stability. In this case the upper part is designed not only to be able to float but also to cause as little resistance as possible when riding on the water at high speed for starting purposes. The lower surface of the upper part of the fuselage may, in this case, be designed with, or without a keel in any manner which is suitable for an efficient start. The floating bodies have such configuration as to closely cling to the upper part of the fuselage when in flying position. Steps which may be at the bottom surface of the upper part of the fuselage are then covered by the floats. It is in most cases desirable to provide the floats with steps which reduce the water friction when the floats move fast on the water, for example, when starting, and which are not exposed to the wind when the aircraft is in the air.

Mechanisms are provided for moving the floats into the desired position and which mechanisms are adapted to be operated from the inside of the upper part of the fuselage. For maintaining the desired position of the floats on the water with respect to the fuselage suitable props or stays are provided.

The construction according to the present invention is suitable also for dropping bombs or other objects from the upper part of the fuselage when the aircraft is in flight through the space produced by temporarily swinging the floats downward and/or outward.

Further and other objects of the present invention will be hereinafter set forth in the accompanying specification and shown in the drawing which, by way of illustration, shows what I now consider to be preferred embodiments of my invention.

In the drawing:

Figure 1 is a diagrammatic lateral view of an aircraft according to the present invention.

Figure 2 is a cross sectional diagrammatic showing of a fuselage according to the present invention.

Figure 3 is a cross sectional diagrammatic showing of a fuselage as shown in Figure 2 which is provided with a niche for receiving objects to be dropped from the aircraft when it is in flight.

Figure 4 is a lateral view of a float having a stepped bottom and being in floating position.

Figure 5 is a cross sectional showing of a modification of an aircraft fuselage according to the present invention.

Referring more particularly to Fig. 1 of the drawing, I represents the fuselage of a flying boat with the individual stabilizing floats 2, 3, 4 and 5 in folded in position. The bottom of the upper part of the fuselage has a step 43 for reducing water friction, which step is completely concealed by the adjacent float members 4 and 5 and ineffective when the aircraft is in the air.

According to Fig. 2 the upper part 6 of the fuselage is closed by a bottom 20. In flying condition the float members 7 and 8 abut against said bottom. Members 7 and 8 are swingable about the axes 9 and 10 respectively and can be brought into the positions 7' and 8' which are shown in dash and dotted lines by swinging them downward over an angle of 90°. With the floats in the positions 7' and 8' and the aircraft having descended on water the floats are immersed in the water up to approximately line W—L.

Figure 4 is a lateral view of a float in swung out position and having the step 11 which reduces water friction when the float slides on the surface of the water and which step is concealed and without effect when the craft is in the air.

The floats 7 and 8 are moved into the desired positions by means of worm gears. The worm wheels 12 and 13 are rigidly connected with the shafts 9 and 10 respectively. One of the worm wheels is right-handed and the other is left-handed. Wheels 12 and 13 are driven by the worms 15 and 16 respectively which wheels are rigidly connected to a shaft 14 which carries a bevel gear wheel 17 which cooperates with a bevel gear wheel 18 which is driven by the hand wheel 19.

The fuselage shown in Fig. 3 is like the fuselage shown in Fig. 2 as to the arrangement of the floats. The bottom of the upper part 6' of the fuselage is provided with a niche 22 in which the bombs 21 are suspended. For dropping the bombs the floats 7 and 8 are swung downward until sufficient space is provided for the bombs or other objects to be dropped from the aircraft to fall through.

Figure 5 shows a modification of the present invention in which the upper part 30 of the fuselage is provided with a keeled bottom. Hinged to said bottom are the float members 31 and 32 which can be turned about the axles 33 and 34, respectively, of the hinges for an angle of approximately 150° until they reach the positions 31' and 32' shown in dash and dotted lines in Fig. 5 in which positions they rest flatly on the water surface W—L. The bottom of the part 30 of the fuselage is made up of two concave parts 36 and 37 which form a keel 35. The bottom comprises a step 38 which extends across the bottom as does the step 43 shown in Fig. 1. The floats 31 and 32 have steps 39 and 40 respectively which are similar to the step 11 in Fig. 4. When the floats are retracted in flying position all steps are covered and a completely smooth and continuous outer surface is produced.

When on the water and swung out the floats 31 and 32 are propped against the upper part 30 of the fuselage by means of stays 41. These can be pushed through suitable openings 44 in the walls of part 30 and into suitable recesses or cavities 42 in the floats 31 and 32 and are fastened to part 30 by means of bolts 45.

While I believe the above described embodiments of my invention to be preferred embodiments, I wish it to be understood that I do not desire to be limited to the exact details of design and construction shown and described, for obvious modifications will occur to a person skilled in the art.

I claim:

1. A hydroaircraft having a fuselage comprising an upper part, a plurality of floats forming the lower part of said fuselage and being hinged to said upper part and being movable into flying and floating position about axes which extend substantially in the direction of flight of said aircraft, said upper part having a keeled bottom surface which floats on the water when said floats are in floating position, said bottom surface being completely covered by said floats when in flying position.

2. A fuselage for hydroaircraft having an upper part, a plurality of floats hinged to said upper part and forming the lower part of said fuselage and being movable into flying and floating position about axes which extend substantially in the direction of flight of said aircraft, said upper part having a stepped bottom surface which floats on the water when said floats are in floating position, said bottom surface being completely covered by said floats when in flying position.

3. A fuselage for hydroaircraft having an upper part, a plurality of floats hinged to said upper part and forming the lower part of said fuselage and being movable into flying and floating position about axes which extend substantially in the direction of flight of said aircraft, said upper part having a stepped and keeled bottom surface which floats on the water when said floats are in floating position, said bottom surface being completely covered by said floats when in flying position.

4. A hydroaircraft having a fuselage comprising an upper part for receiving crew, passengers, freight, operating media and the like, a plurality of float members hinged to said upper part for being moved close to said upper part when said aircraft is in the air, and for being spread apart when said aircraft is on the water, said float members forming the entire lower portion of said fuselage and having an outer surface forming the continuation of the outer surface of said upper part when said float members are in flying position, said upper part having a stepped surface riding on the water when said float members are spread apart and in floating position, said stepped surface being inside said fuselage and covered by said float members when said members are in flying position and moved close to said upper part.

5. A hydroaircraft having a fuselage comprising an upper part for receiving crew, passengers, freight, operating media and the like, a plurality of float members hingedly connected with said upper part for being moved close to said upper part when said aircraft is in the air and for being spread apart when said aircraft is on the water, said float members forming the entire lower portion of said fuselage and having an outer surface forming the continuation of the outer surface of said upper part when said floats are in flying position, said upper part having a stepped surface riding on the water when said float members are spread apart and in floating position, said float members having stepped surfaces riding on the water when said floats are in floating position and corresponding to the stepped surface of said upper part and being adjacent thereto and inside said fuselage when said float members are in flying position and close to said upper part.

6. A fuselage for hydroaircraft comprising an upper portion having a substantially uninterrupted bottom, a plurality of protractable floats disposed underneath said upper portion, hinge means connecting said floats and said upper portion and being disposed substantially in the direction of flight, said floats, when in retracted position, abutting one another and said upper portion and exclusively forming the entire lower portion and a substantially uninterrupted bottom surface of said fuselage and together forming a protective body safeguarding the bottom surface of said upper portion against impacts from below.

7. A fuselage for hydroaircraft comprising an upper portion, a float body longitudinally divided into half-members individually swingably connected with said upper portion and abutting said upper portion and one another and exclusively forming the lower portion and an uninterrupted bottom portion of said fuselage when in rest position and together forming a protective body safeguarding the bottom surface of said upper portion against impacts from below and being swung apart when in operating position.

8. In a fuselage for hydroaircraft having an upper portion provided with a bottom, a lower portion made up of a pair of individual float members laterally swingably connected with said upper portion and being swingable to and from one another and downwardly and outwardly with respect to said bottom, said float members individually having a stepped bottom forming surface portion comprising a substantially rectangularly recessed portion having a recessed surface separated from and facing the corresponding recessed surface portion of the other float member, and comprising a prominent surface having a substantially transverse step forming edge and a longitudinal edge portion extending therefrom and disposed on the outer side of said float member, said prominent surface and said edge portion abutting the corresponding prominent surface and edge portion of the other float member and concealing said recessed portion from the outside, and said float members, when swung toward one another, forming a substantially uninterrupted bottom surface of said fuselage.

9. In a fuselage for hydroaircraft having an upper portion provided with a bottom, a lower portion made up of individual float members laterally swingably connected with said upper portion and being swingable to and from one another and downwardly and outwardly with respect to said bottom, said float members individually having a surface portion abutting a corresponding surface portion of another of said float members and having a recessed portion forming a substantially transverse step in said surface portion and facing the corresponding recessed portion of another float member when said members are swung towards one another, said surface portion forming a stepped bottom surface of said float members when said members are swung apart and downward, said float members having outer walls forming the longitudinal outer walls of said recessed portions and longitudinally edgewise abutting one another and forming a substantially uninterrupted bottom surface of said fuselage and closing the cavity formed by said recessed portions when said float members are swung toward one another.

CLAUDE DORNIER.